(12) United States Patent
Cai (10) Patent No.: US 11,155,382 B1
(45) Date of Patent: Oct. 26, 2021

(54) STACKABLE STORAGE SYSTEM WITH PRESSURE SENSITIVE LOCK

(71) Applicant: Meridian International Co., Ltd., Shanghai (CN)

(72) Inventor: Shujun Cai, Shanghai (CN)

(73) Assignee: MERIDIAN INTERNATIONAL CO., LTD., Shanghai (CN)

( * ) Notice: Subject to any disclaimer, the term of this patent is extended or adjusted under 35 U.S.C. 154(b) by 0 days.

(21) Appl. No.: 17/010,975

(22) Filed: Sep. 3, 2020

(30) Foreign Application Priority Data

Jul. 29, 2020 (CN) .......................... 202010746598.4

(51) Int. Cl.
*B65D 21/02* (2006.01)
*F16B 5/06* (2006.01)

(52) U.S. Cl.
CPC ..... *B65D 21/0228* (2013.01); *B65D 21/0213* (2013.01); *B65D 21/0217* (2013.01); *B65D 21/0223* (2013.01); *F16B 5/06* (2013.01)

(58) Field of Classification Search
CPC ............ B65D 21/0228; B65D 21/0213; B65D 2501/24585; B65D 2501/24592; B65D 2501/24605; B65D 2501/2461; B65D 2501/24636; B65D 2501/24643; B65D 2501/24675; F16B 5/06; Y10T 403/60
USPC ........................ 220/4.27; 206/1.5, 503, 509
See application file for complete search history.

(56) References Cited

U.S. PATENT DOCUMENTS

| | | |
|---|---|---|
| 8,567,796 B2 | 10/2013 | Bar-Erez et al. |
| 8,936,258 B2 | 1/2015 | Bar-Erez et al. |
| 9,132,543 B2 | 9/2015 | Bar-Erez et al. |
| 9,566,990 B2 | 2/2017 | Bar-Erez et al. |
| 9,643,629 B2 | 5/2017 | Bar-Erez et al. |
| 10,106,180 B2 | 10/2018 | Bar-Erez et al. |
| 2016/0236592 A1* | 8/2016 | Peniche ................ B60N 2/0725 |
| 2017/0121056 A1* | 5/2017 | Wang ........................ B25H 3/02 |
| 2017/0151972 A1 | 6/2017 | Bar-Erez et al. |
| 2018/0220758 A1 | 8/2018 | Burchia |
| 2019/0308772 A1 | 10/2019 | Gonitianer et al. |
| 2019/0315515 A1 | 10/2019 | Gonitianer et al. |
| 2020/0025229 A1 | 1/2020 | Baruch |
| 2020/0346819 A1* | 11/2020 | Kogel ................ B65D 21/0223 |

FOREIGN PATENT DOCUMENTS

| | | |
|---|---|---|
| DE | 202015106823 | 3/2017 |
| DE | 2015013053 | 4/2017 |
| WO | 2019105598 | 6/2019 |

OTHER PUBLICATIONS

Extended European search report, European App. No. 20194860.1-1017, dated Mar. 9, 2021, 8 pages.

* cited by examiner

*Primary Examiner* — Rafael A Ortiz
*Assistant Examiner* — Sanjidul Islam
(74) *Attorney, Agent, or Firm* — Shuttleworth & Ingersoll, PLC; Jason Sytsma (57) ABSTRACT

A stackable storage system with a pressure sensitive lock where downward pressure on the first container causes a surface of a first locking portion on a first container to slide against an inclined surface of a second locking portion on a second container and causes the inclined surface of the second locking portion to pivot outward and snap back into place to connect the first container and the second container.

14 Claims, 7 Drawing Sheets

STACKABLE STORAGE SYSTEM WITH PRESSURE SENSITIVE LOCK

CROSS-REFERENCE TO RELATED APPLICATIONS

This application claims priority to Chinese Patent Application 202010746598.4 filed Jul. 29, 2020, the entirety of which is incorporated by reference herein.

TECHNICAL FIELD

The present invention relates to a container constructed and arranged to be connected to other containers.

BACKGROUND INFORMATION

Numerous container storage systems are known in the art. There is, however, a constant need in the industry to improve upon existing container storage systems by making them more efficient, easy to use, modular, and/or multifunctional.

SUMMARY

Disclosed is a stackable storage system with a pressure sensitive lock. The system comprises of a first storage container configured and arranged to be selectively connected to a second storage container when the first storage container is on top of the second storage container. Each of the first container and the second container comprises a first locking portion on a bottom side of the container and a second locking portion on a top side of the container. Downward pressure on the first container causes the first locking portion of the first container and the second locking portion of the second container to engage with each other to connect the first container and the second container.

More specifically, the first locking portion comprises of a surface and the second locking portion comprises an inclined surface. Downward pressure on the first container causes the surface of the first locking portion of the first container and inclined surface of the second locking portion of the second container to slide against each other to connect the first container and the second container. The inclined surface of the second locking portion is biased against the respective first container and the second container by an elastic member so that when downward pressure on the first container causes the surface of the first locking portion of the first container and inclined surface of the second locking portion of the second container to slide against each other, the inclined surface of the second locking portion pivots outward and snaps back into place to connect the first container and the second container.

The second locking portion can comprise of a pivot and a block combined to the pivot wherein the block comprises the inclined surface to slide against the surface of the first locking portion to connect the first container and the second container. The second locking portion can comprise of a mounting base securely combined to each container. A first pivot portion is combined to the mounting base. A second pivot portion is combined to the locking member. A pivot combines the first pivot portion of the mounting base and the second pivot portion of the locking member for pivot movement of the locking member with respect to the mounting base.

In some embodiments, the locking member further comprises of a depression for manual movement of the locking member. Also two blocks with one block on each side of the depression can be provided instead of one block. In each instance, the inclined surface of the block slides against a corresponding surface of the first locking portion.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

The present invention provides a latch mechanism configured to secure two containers 7*a*, 7*b* together automatically, which includes a first locking portion 1 and a second locking portion 2, the first locking portion 1 and the second locking portion 2 can lock each other automatically.

Figure 1:
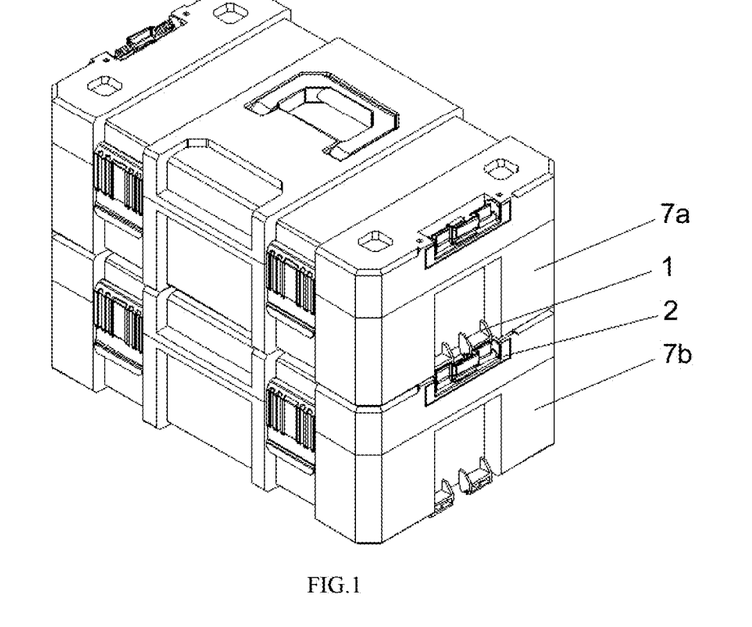
FIG. 1 shows a side perspective view of a first storage container stacked on top of a second storage container and latched together according to an embodiment of this disclosure.
Figure 2:
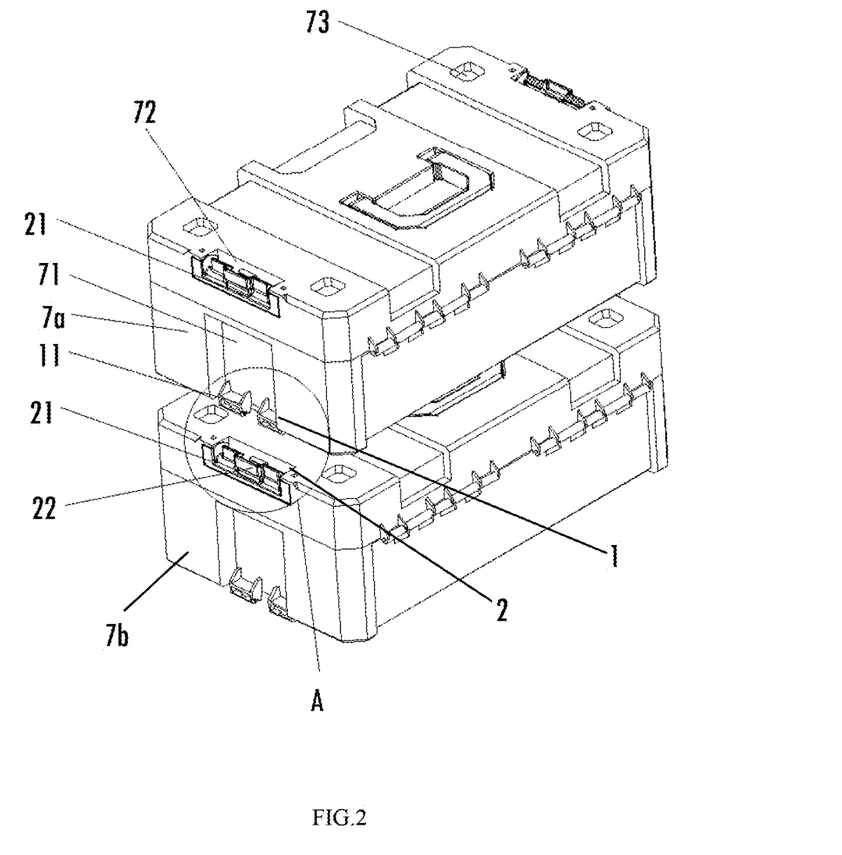
FIG. 2 shows another side perspective view of the first storage container separated from the second storage container.

Please refer to FIGS. 1-2, the first locking portion 1 is located at the bottom of the container, wherein the first locking portion 1 is formed with protrusion 11. And the second locking portion 2 is located at the top of the container, wherein the second locking portion 2 includes a mounting base 21 provided with locking member 22 and elastic member 5. The locking member 22 can engaged with the protrusion 11 to connected two containers by simply placing one container on top of the other and applying moderate downward pressure to the top container.

Figure 7:
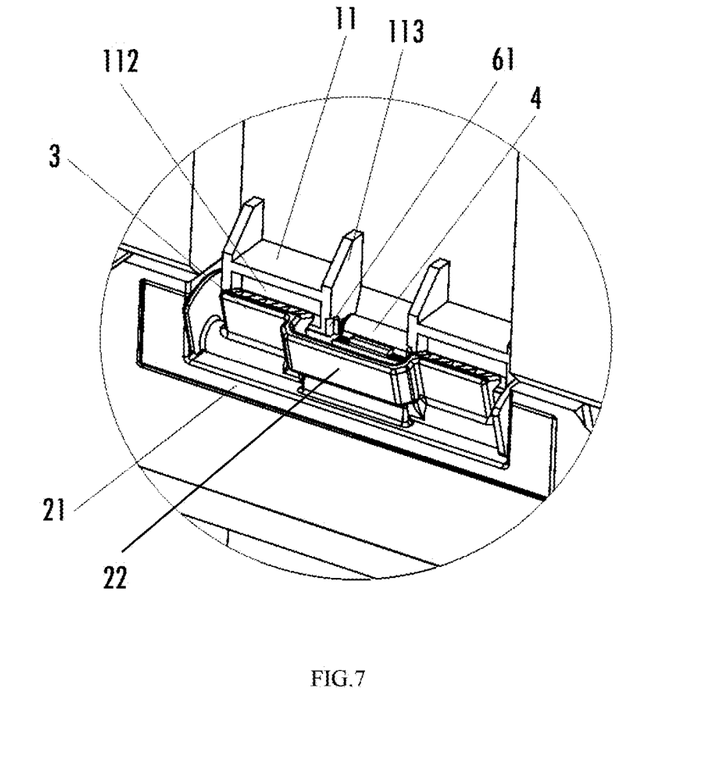
FIG. 7 is a close-up view of the second locking portion in the release position.

The locking member 22 is pivotally arranged in the mounting base 21 by pivot 221, and has a locking position (please refer to FIGS. 1-3) and a release position (please refer to FIG. 7). The locking member 22 switches between the locking position and the release position by rotating. The elastic member 5 is arranged between the locking member 22 and the mounting base 21, and the elastic member 5 biases the locking member 22 to keep it in the locking position. In other words, in the absence of external force, the locking member 22 is in the locking position due to the elasticity of the elastic member 5. Regarding the related structure of the elastic member 5, we will describe it later.

Figure 4:
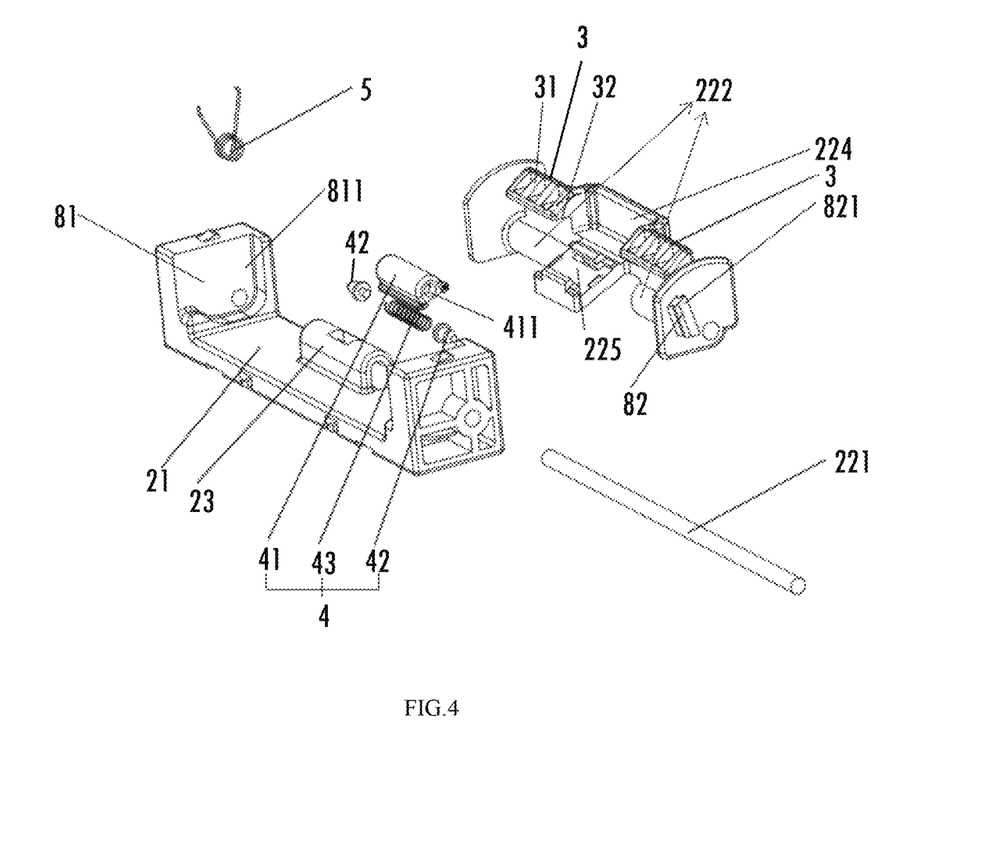
FIG. 4 is an exploded view of the locking member and the mounting base shown in FIG. 3.
Figure 5:
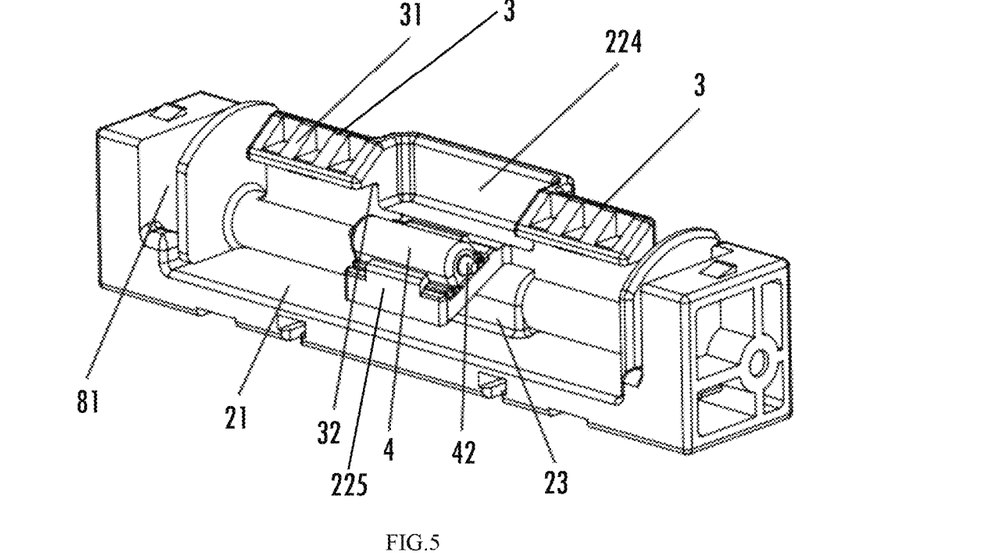
FIG. 5 is a perspective view of the second locking portion on top of the second storage container.
Figure 6:
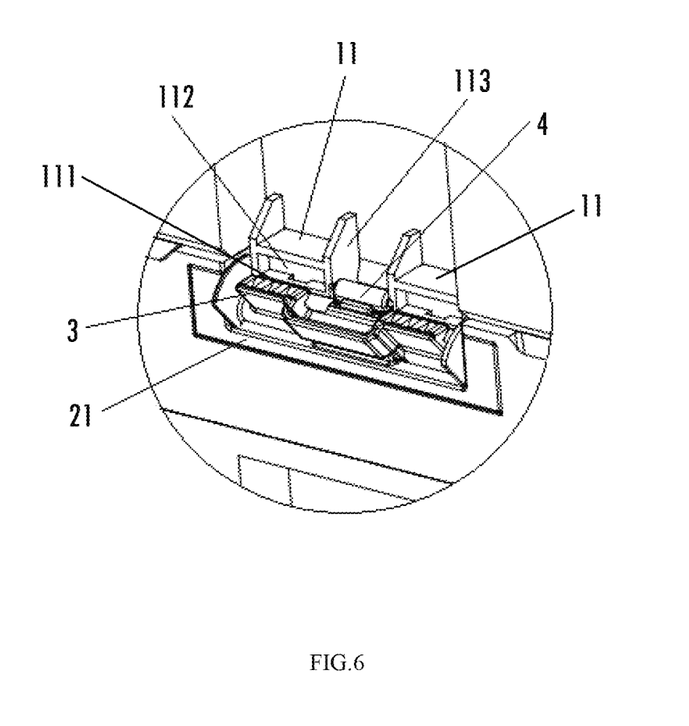
FIG. 6 is a close-up view of the second locking portion in the holding position.

Specifically, please refer to FIGS. 4-5, there is a first pivot portion 23 in the mounting base 21, and there is a second pivot portion 222 on the locking member 22. The pivot 221 pass through the first pivot portion 23 and the second pivot portion 222 to connect the locking member 22 and the mounting base 21, and the locking member 22 can rotate relative to the mounting base 21. In the embodiment, the first pivot portion 23 is located in the middle of the mounting base 21, and the second pivot portion 222 includes two parts which are arranged at both ends of the locking member 22 separately. When the locking member 22 and the mounting base 21 are pivotally connected to each other, the first pivot portion 23 is located between the two parts of second pivot portion 222. In other embodiments, the first pivot portion 23 and the second pivot portion 222 can be arranged with other different quantities and arrangements, for example, only one of the first pivot portion and the second pivot portion are provided, and one is arranged on the left, the other one is arranged on the right.

Please refer to FIGS. 1-4, the first locking portion 1 includes two protrusions 11, wherein each protrusion 11 is provided with an opening 112 and a bottom wall 111. Correspondingly, the locking member 22 of the second locking portion 2 is provided with two blocks 3. The blocks 3 are formed by extending from the inner surface of the locking member 22 toward the direction close to the container, which include an inclined surface 31 and a bottom surface 32, respectively.

Figure 3:
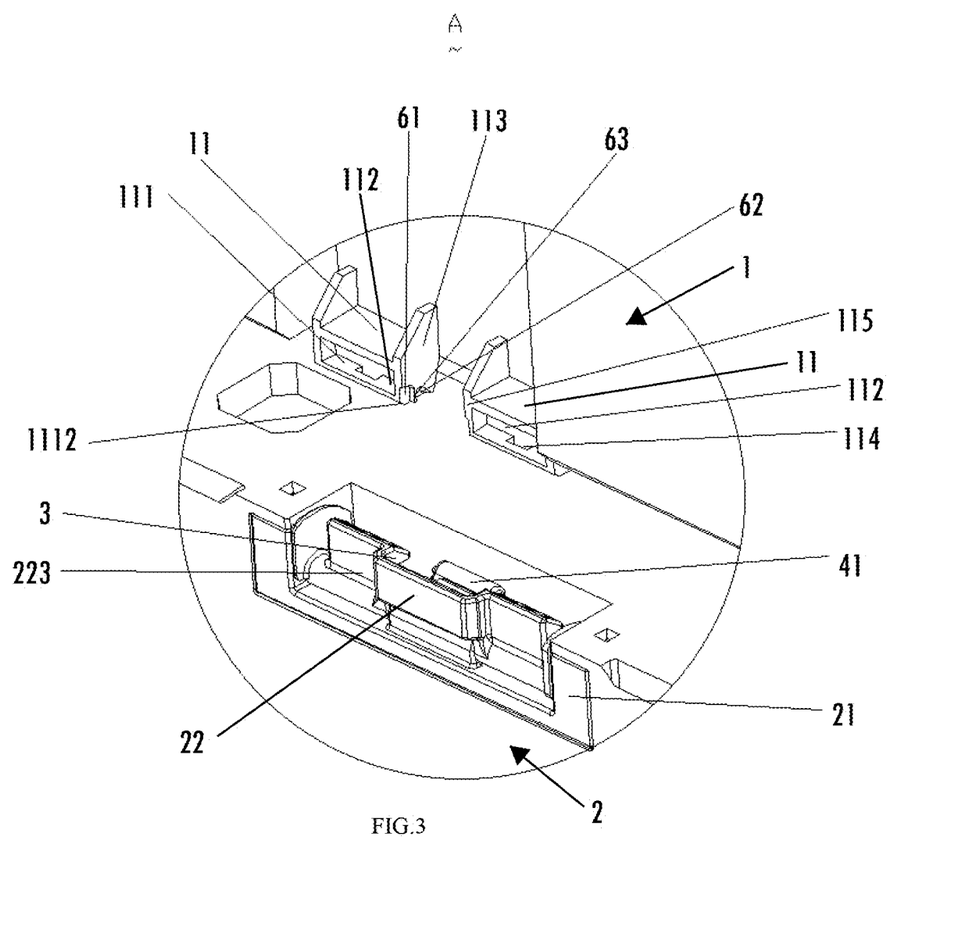
FIG. 3 shows enlarged area A of FIG. 2.

As described above, the locking member 22 is in locking position due to the elasticity of elastic member 5 without external force (please refer to FIGS. 2-3). When two containers need to be connected and locked, just align one container with the other container and apply moderate downward pressure to the top container. During the locking process, the bottom wall 111 on the top container and the inclined surface 31 on the bottom container contact and resist each other. With the gradual sinking of the top container, the bottom wall 111 push the inclined surface 31 to rotate away from the container. In other words, the bottom wall 111 pushes the blocks 3 and the locking member 22 to rotate toward the release position. It is not difficult to understand that the bottom wall 111 on the top container needs to overcome the elasticity force of the elastic member 5 on the bottom container to push the locking member 22 to rotate toward the release position. When the top container sinks to a position that can be locked, the bottom wall 111 on the top container and the inclined surface 31 on the bottom container no longer contact and resist each other, and the bottom wall 111 is located below the bottom surface 32 of the block 3 on the bottom container. At this point, the locking member 22 has been rotated to the release position. At the same time, due to the loss of the resistance of the bottom wall 111 on the top container, the elastic member 5 on the bottom container automatically rotates the locking member 22 on the bottom container back to the locking position. With the rotate of the locking member 22, the two blocks 3 also rotate and enter the two openings 112 on the top container respectively. When the locking member 22 returns to the locking position, the two blocks 3 also completely enter the two openings 112 on the top container respectively. In this way, the two containers are locked to each other. In short, during the locking process of the two containers, the locking member 22 will automatically complete the rotation from the locking position to the release position and then back to the locking position. Just placing one container on top of the other and applying moderate downward pressure to the top container, the two containers will lock each other automatically. It is worth noting that the application of downward force may also achieved under the natural weight of the top container.

Furthermore, please refer to FIG. 3, the bottom wall 111 is provided with a surface 1112. Surface 1112 can be at an angle to or parallel with the inclined surface 31 on the block 3. As shown, surface 1112 is an inclined mating surface parallel to the inclined surface 31 on block 3.

Furthermore, please refer to FIG. 3, the bottom wall 111 is provided with a hole 114, correspondingly, the block 3 is provided with a protrusion (not shown) on the bottom surface 32. When the locking member 22 rotates back to the locking position, the block 3 enters the opening 112, also the protrusion on the bottom surface 32 engages the hole 114 on the bottom wall 111.

Please refer to FIGS. 1-7, in this embodiment, there are two protrusions 11 and two corresponding blocks 3. In other embodiment, one or more pairs of protrusion and block may also be provided.

Please refer to FIGS. 4-5, there is a depression 224 on the locking member 22 for user's fingers to enter. Thus, the user can rotate the locking member 22. In this embodiment, the depression 224 is located between the two blocks 3.

When two containers need to be released from each other, the user can operate the depression 224 on the bottom container to rotate the locking member 22 from the locking position to the released position. When the locking member 22 rotates to the released position, the blocks 3 on the locking member 22 disengaged with the openings 112 on the protrusions 11 respectively, and the user can remove the top container. However, due to the elasticity of the elastic member 5, the locking member 22 on the bottom container will return to the locking position without the external force, so the user needs to operate the locking member 22 to keep it in the release position while removing the top container. It is not convenient and difficult to complete. It is necessary to provide a structure to keep the locking member 22 in a releasable position, so that the user can easily remove the top container.

Please refer to FIGS. 4-5, there is shown a positioning assembly 4 on the locking member 22. The locking member 22 is provided with a mounting portion 225 for receiving the positioning assembly 4. Specifically, the positioning assembly 4 includes a main body 41 with a through-hole 411, a spring 43 arranged in the through-hole 411, and two ends 42 respectively arranged at both ends of the spring 43. With reference to FIG. 5, shown is the main body 41 received in the mounting portion 225 of the locking member 22. It is worth noting that the connection of the main body 41 and the mounting portion 225 can be detachable, and the two also can be integrally formed. In the absence of external force, the two ends 42 are exposed to the through-hole 411 (or the main body 41). When pressed by external force, the two ends 42 can be hidden in the through-hole 411 (or the main body 41). In this embodiment, the mounting portion 225 is located between the two blocks 3 and below the depression 224.

Correspondingly, both the two protrusions 11 on the top container have a side surface 113 close to the positioning assembly 4. Since the two protrusions 11 are symmetrical, only one side surface 113 on one protrusion 11 is described (though they need not be symmetrical). With reference to FIGS. 3 and 8-10, the side surface 113 is provided with a first area 61, a second area 62, and a wall 63 for separating the first area 61 and the second area 62. First area 61 and second area 62 provide a space for expansion of two ends 42 out of through-hole 411 by spring 43 and wall 63 serves to push two ends 42 into through-hole 411.

Figure 8:
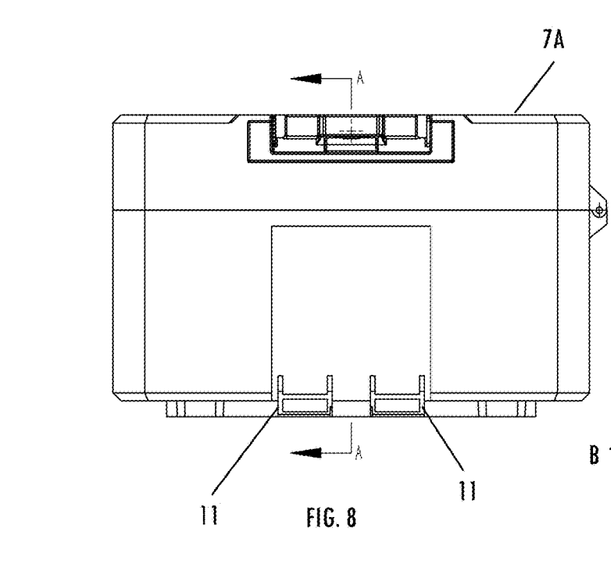
FIG. 8 is a side view of the first container of FIG. 1.
Figure 9:
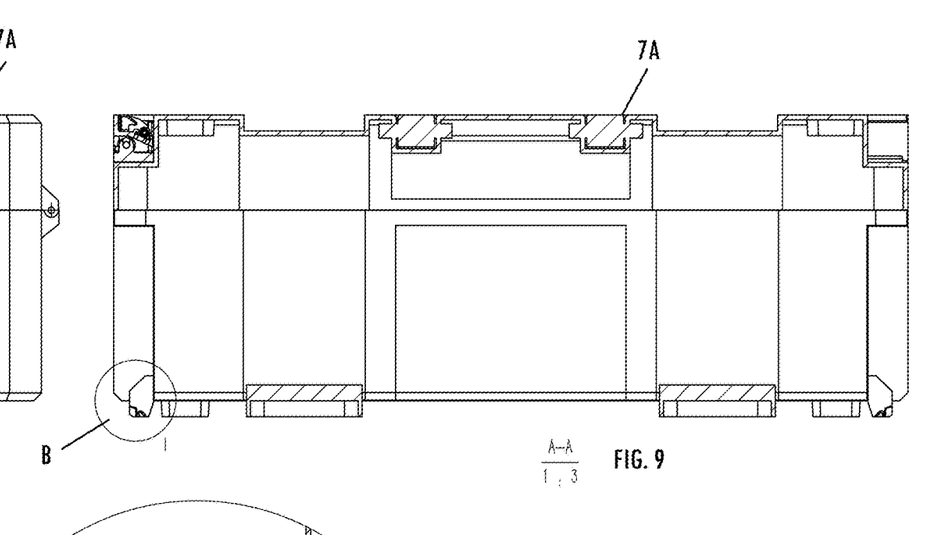
FIG. 9 is a cross-sectional view taken from direction A-A of FIG. 8.
Figure 10:
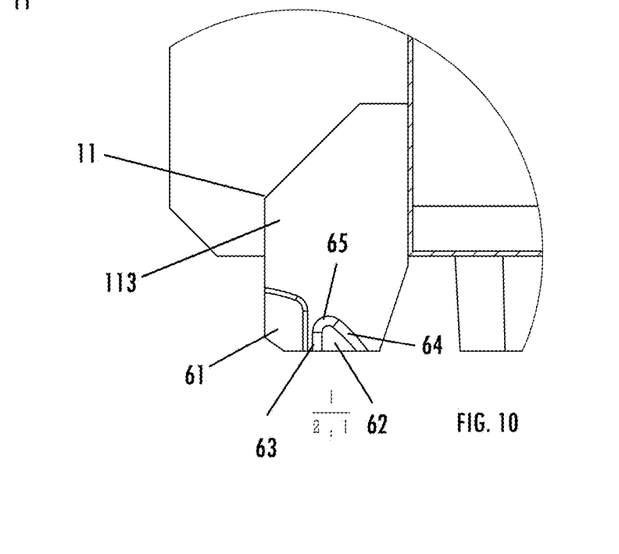
FIG. 10 is a close-up view of area B of FIG. 9.

First area 61 and second area 62 can also be formed as notches in side surface 113 that can take any geometrical shape as long as there is space for the arcuate path of travel of two ends 42 from rotation of locking member 22 and wall 63 separating first area 61 and second area 62 to hold locking member in respective positions. As shown in FIGS. 8-10, second area 62 can have a curved shape with a sloped edge 64. As positioning assembly 4 is moved, end 42 is biased outward by spring 43 travels against sloped edge 64. In the locking position, ends 42 are extended outward at the end of the curve furthest away from first area 61. At the opposite end at an apex 65 of the curve, ends 42 are pushed inward by sloped edge 64 as positioning assembly is moved toward first area 61 so that the positioning assembly is in the release position. In total, positioning assembly 4 can be rotated with respect to two protrusions 11 between three positions, a locking position, a release position, and a holding position.

When two containers need to be locked, the positioning assembly 4 rotates with the locking member 22. During this process, the two ends 42 of the positioning assembly 4 can move back and forth in the second area 62 along sloped edge 64 of the curve. Please refer to FIG. 7, the locking member 22 is in the release position, the blocks 3 are disengaged with the opening 112, and the ends 42 of the positioning assembly 4 are at apex 65 of sloped edge 64 of the curve closest to wall 63 separating first area 61 and second area 62.

When two containers need to be released, the user needs to operate the depression 224 to rotate the locking member 22 from the locking position to the release position, and then continue to rotate the locking member 22. At this time, because of the wall 63, the two ends 42 of the positioning assembly 4 are retracted and hidden in the through-hole 411. Until the positioning assembly 4 crosses the wall 63 and enters the first area 61, both ends 42 of the positioning assembly 4 protrude and exposed to the through-hole 411. The user can no longer operate the depression 224 now, and the locking member 22 rotates toward the locking position due to the elasticity of the elastic member 5. Please refer to FIG. 6, the ends 42 against the wall 63, and the positioning assembly 4 cannot cross the wall 63 to enter the second area 62.

In other words, the locking member 22 cannot return to the locking position, and is held in a holding position where the locking member 22 is kept in a releasable position due to the resistance of the wall 63.

After positioning assembly 4 crosses over the wall 63 into the first area 61, the end 42 protrude and exposed to the through-hole 411 again. Due to the elastic member 5, the locking member 22 and the end 42 can rotate back. However, the wall 63 prevents the end 42 from rotating back to the second area 62. The end 42 abuts against the wall 63, so that the locking member 22 cannot rotate back, that is, the locking member 22 is kept in an releasable position, which is the holding position. When the locking member 22 is in the holding position (FIG. 6), the user can tap the outer side of the locking member 22 to make it cross the wall 63, then two containers can be locked again.

Further, a limit structure is provided to limit the rotation angle of the locking member 22. Please refer to FIG. 4, the elastic member 5 is a torsional spring. Both ends of the mounting base 21 are provided with a receiving recess 81 and a resisting side 811. Both ends of the locking member 22 are provided with a stopper 82. The elastic member 5 is disposed in the receiving recess 81, one end is against the resisting side 811, and the other end against the stopper 82. When the locking member 22 rotates from the locking position to the release position or holding position, the stopper 82 also rotates toward the resisting side 811. Furthermore, the stopper 82 is provided with a groove 821 for receiving the end of the elastic member 5.

It should be noted that, in this embodiment, a set of limit structure are respectively provided at both ends of the mounting base 21, and symmetrical to each other. In other embodiment, only one set of limit structure can be provided at one end of the mounting base 21.

Please refer to FIG. 2, two recesses 71 and two notches 72 are provided for receiving the two first locking portions 1 and the two second locking portions 2.

Furthermore, for better alignment of the two containers, there are four positioning recesses 73 on the top of the container, correspondingly, the bottom of the container is provided with four positioning protrusions (not shown).

It needs to be clear that the first locking portion 1 and the second locking portion 2 can be detachably mounted on the container as separate components, or can be integrally formed with the container, also the positions of the first and second locking member on the container can be interchanged.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. A stackable storage system comprising:
a first storage container configured and arranged to be selectively connected to a second storage container when the first storage container is on top of the second storage container;
wherein each of the first container and the second container comprises a first locking portion on a bottom side of the respective first container and the second container and a second locking portion on a top side of the respective first container and the second container; and
wherein downward pressure on the first container causes the first locking portion of the first container and the second locking portion of the second container to engage with each other to connect the first container and the second container, wherein the second locking portion comprises of a mounting base securely combined to the respective first container and the second container, a first pivot portion combined to the mounting base, a locking member, a second pivot portion combined to the locking member, and the pivot combining the first pivot portion of the mounting base and the second pivot portion of the locking member for pivot movement of the locking member with respect to the mounting base.

2. The stackable storage system of claim 1, wherein the locking member further comprises of a depression for manual movement of the locking member and two blocks with one block on each side of the depression wherein the two blocks each comprise an inclined surface to slide against a corresponding surface of the first locking portion.

3. The stackable storage system of claim 2, and further comprising an elastic member that biases the locking member against the mounting base so that when downward pressure on the first container causes the surface of the first locking portion of the first container and inclined surface of the second locking portion of the second container to slide against each other the inclined surface of the second locking portion pivots outward and snaps back into place to connect the first container and the second container.

4. The stackable storage system of claim 1, wherein the first locking portion comprises a protrusion with an opening and a surface underneath the opening and the second locking portion comprises of a block with an inclined surface, wherein downward pressure on the first container causes the surface of the protrusion of the first locking portion of the first container and inclined surface of the block of the second locking portion of the second container to slide against each other to connect the first container and the second container.

5. The stackable storage system of claim 4, and further comprising a positioning assembly combined to a locking member of the second locking portion, wherein the locking member comprises the block with the inclined surface and the positioning assembly selectively holds the locking member in one of a locking position, a release position, and a holding position.

6. The stackable storage system of claim 5, wherein the first locking portion comprises a pair of protrusions each with an opening and a surface underneath the opening, and wherein the second locking portion comprises of a pair of blocks each with an inclined surface, wherein downward pressure on the first container causes the surface of the each of the pair of protrusions of the first locking portion of the first container and inclined surface of the pair of blocks of the second locking portion of the second container to slide against each other to connect the first container and the second container.

7. A stackable storage system comprising:
a first storage container configured and arranged to be selectively connected to a second storage container when the first storage container is on top of the second storage container;
wherein each of the first container and the second container comprises a first locking portion on a bottom side of the respective first container and the second container and a second locking portion on a top side of the respective first container and the second container;
wherein the first locking portion comprises a protrusion with an opening and a surface underneath the opening and the second locking portion comprises of a block with an inclined surface, wherein downward pressure on the first container causes the surface of the protrusion of the first locking portion of the first container and inclined surface of the block of the second locking portion of the second container to slide against each other to connect the first container and the second container; and
a positioning assembly combined to a locking member of the second locking portion, wherein the locking member comprises the block with the inclined surface and the positioning assembly selectively holds the locking member in one of a locking position, a release position, and a holding position, wherein the positioning assembly further comprises of an outwardly biased end and the protrusion of the first locking portion comprises of a first area and a second area separated by a wall, wherein in the locking position the outwardly biased end is positioned in the second area and the outwardly biased end is extending outward to lock the block of the locking member in the opening of the protrusion, and wherein in the release position the outwardly biased end is positioned in the second area and the outwardly biased end is pushed inward by an edge of the second area.

8. The stackable storage system of claim 7, wherein in the holding position the outwardly biased end is positioned in the first area and the end is extending outward.

9. The stackable storage system of claim 7, wherein the second area has a curved shape.

10. A stackable storage system comprising:
a first storage container configured and arranged to be selectively connected to a second storage container when the first storage container is on to of the second storage container;
wherein each of the first container and the second container comprises a first locking portion on a bottom side of the respective first container and the second container and a second locking portion on a top side of the respective first container and the second container; and
wherein downward pressure on the first container causes the first locking portion of the first container and the second locking portion of the second container to engage with each other to connect the first container and the second container, wherein the second locking portion comprise of a locking member that comprises the pair of blocks and further comprises of a depression positioned between the pair of blocks for manual manipulation of the locking member and a positioning assembly positioned between the pair of blocks for selectively holding the locking member in one of a locking position, a release position, and a holding position.

11. The stackable storage system of claim 10, wherein the positioning assembly comprises a spring and pair of ends each simultaneously outwardly biased by the spring.

12. The stackable storage system of claim 11, wherein the pair of protrusions each comprise an inner side surface that face towards each other and further comprise a first area and a second area separated by a wall wherein pair of ends of the positioning assembly are selectively outwardly engaged in the respective first area and the second area and inwardly pushed in by the wall.

13. The stackable storage system of claim 12, wherein in the locking position the outwardly biased ends are positioned in the respective second area and the pair of ends are extending outward to lock the pair of blocks of the locking member in the opening of the protrusion, and wherein in the release position the outwardly biased pair of ends are positioned in the second area and the pair of ends are each pushed inward by an edge of the second area.

14. The stackable storage system of claim 13, wherein the second area has a curved shape.

* * * * *